United States Patent [19]

Takajo et al.

[11] Patent Number: 5,009,520
[45] Date of Patent: Apr. 23, 1991

[54] DYNAMIC PRESSURE TYPE BEARING AND SPINDLE UNIT

[75] Inventors: Toshimi Takajo, Fujisawa; Hiromitsu Asai, Samukawa; Kiyoshi Haginuma, Fujisawa, all of Japan

[73] Assignee: Nippon Seiko Kabushiki Kaisha, Tokyo, Japan

[21] Appl. No.: 510,619

[22] Filed: Apr. 18, 1990

[30] Foreign Application Priority Data

Apr. 26, 1989 [JP] Japan .................. 1-106866

[51] Int. Cl.⁵ .................. F16C 32/06; F16C 33/22
[52] U.S. Cl. .................. 384/100; 384/909
[58] Field of Search .............. 384/100, 114, 115, 118, 384/119, 120, 125, 297, 907, 909

[56] References Cited

U.S. PATENT DOCUMENTS

| | | | |
|---|---|---|---|
| 3,342,667 | 9/1967 | Berlinghof, Jr. | 384/297 X |
| 4,509,803 | 4/1985 | Takenaka et al. | 384/907 X |
| 4,774,749 | 10/1988 | Furumura | 384/907 X |
| 4,875,263 | 10/1989 | Furumura | 29/149.5 |
| 4,934,836 | 6/1990 | Tanaka et al. | 384/100 |

FOREIGN PATENT DOCUMENTS 63-203916  8/1988  Japan .
63-243521 10/1988  Japan .
63-251626 10/1988  Japan .

*Primary Examiner*—Thomas R. Hannon
*Attorney, Agent, or Firm*—Basile and Hanlon

[57] ABSTRACT

A dynamic pressure type bearing is applicable to a precision mechanical equipment. The bearing includes a hollow inner cylinder to fit a rotatable shaft. The inner cylinder is made of a thermosetting resin containing a 5 wt % to 75 wt % heat treated phenol resin powder and a 5 wt % to 75 wt % silicon dioxide, the total content of the phenol resin powder and the silicon dioxide being 50 wt % to 80 wt %. A spindle unit includes the bearing and a spindle made of an alloy containing aluminum as a main element. The bearing has a superior wear resistance, frictional characteristic and molding accuracy of the inner cylinder. The superior frictional characteristic of the inner cylinder allows a relatively soft spindle to be used in a spindle unit.

7 Claims, 2 Drawing Sheets

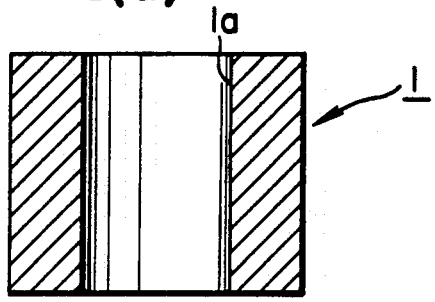
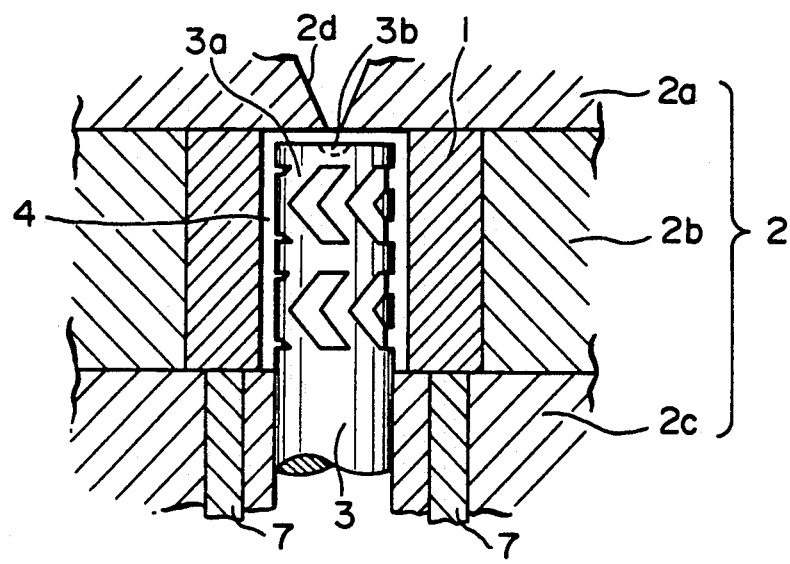
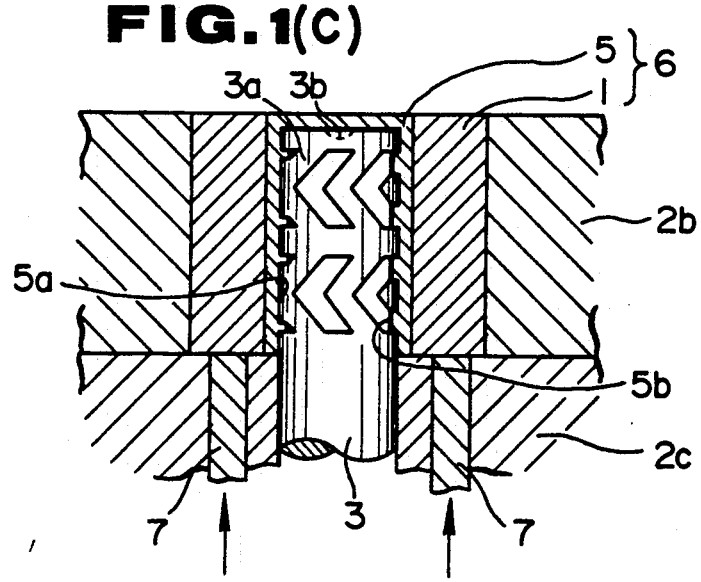

DYNAMIC PRESSURE TYPE BEARING AND SPINDLE UNIT

BACKGROUND OF THE INVENTION

1. Field of the Invention

The present invention relates to a dynamic pressure type bearing and a spindle unit employing the dynamic pressure type bearing, both used in a precision mechanical equipment, e.g., office equipment, acoustic apparatus or measuring apparatus.

2. Description of the Related Art

Hitherto, the present applicant proposed prior-art dynamic pressure type bearings disclosed in Examined Japanese Application Nos. SHO 63-203916 (U.S. Pat. No. 4875,263), SHO 63-243521 and SHO 63-251626.

Examined Japanese Patent Application No. SHO 63-203916 discloses a prior-art dynamic pressure type bearing having a hollow outer cylinder made of metal and a hollow inner cylinder fastened to the inner cylindrical surface of the outer cylinder and made of a thermosetting resin. The inner cylindrical surface of the inner cylinder defines a dynamic pressure producing groove therein. The inner cylinder is fastened to the outer cylinder during molding of the inner cylinder. When the volume of the inner cylinder shrinks in the molding thereof, the bore diameter of the inner cylinder becomes larger since the outer diameter of the inner cylinder remains constant. Thus, a mold defining the inner cylindrical surface of the inner cylinder is readily released therefrom, so that the dynamic pressure producing groove is protected from damage.

However, since a thermosetting resin has a poor wear resistance and frictional characteristic, a dynamic pressure type bearing directly employing the thermosetting resin as a material for the inner cylinder thereof cannot be expected to have a high durability. In addition, the high molding shrinkage percentage of the thermosetting resin will not provide a high molding accuracy.

In accordance with the prior art, a solid lubricant, e.g., a fluorocarbon polymer (e.g., PTFE), has been mixed with the thermosetting resin used for the inner cylinder in order to increase the wear resistance of the inner cylinder. However, the mixture of the solid lubricant causes the molding shrinkage percentage of a molded product made of the thermosetting resin to increase so as to further decrease the molding accuracy of the molded product. Thus, the mixture of the solid lubricant cannot provide an effective solution to increase the durability and the molding accuracy of the molded product.

In particular, since the bore diameter of an air dynamic pressure type bearing is critical, a high molding shrinkage percentage is fatal. In addition, a dynamic pressure type bearing of a poor wear resistance and frictional characteristic cannot be employed for an air dynamic pressure type bearing which employs no lubricant.

In addition, since the poor frictional characteristic of the inner cylindrical surface of the inner cylinder of the bearing produces a large friction on a mating rotatable shaft, this bearing cannot be used with a rotatable shaft made of a light metal, e.g., an aluminium alloy, which is light and inexpensive; but soft to damage.

SUMMARY OF THE INVENTION

In view of such outstanding prior-art problems, an object of the present invention is to provide a dynamic pressure type bearing having a superior wear resistance and frictional characteristic to provide a high molding accuracy and a light, inexpensive spindle unit made with this dynamic pressure type bearing.

In order to achieve the object, the present invention provides a dynamic pressure type bearing comprising: a hollow outer cylinder made of a metal; and a hollow inner cylinder made of a synthetic resin and having the outer cylindrical surface thereof fastened to the inner cylindrical surface of the outer cylinder, with the inner cylindrical surface fitting a rotatable shaft, at least one of the outer cylindrical surface of the rotatable shaft and the inner cylindrical surface of the inner cylinder defining a dynamic pressure producing groove therein, the inner cylinder being made of a thermosetting resin containing 5 wt % to 75 wt % heat treated phenol resin powder and 5 wt % to 75 wt % silicon dioxide, the total content of the heat treated phenol resin powder and silicon dioxide being 50 wt % to 80 wt %.

A spindle unit of the present invention comprises a dynamic pressure type bearing as described above and a spindle made of an alloy containing aluminium as a main element and fitting the inner cylindrical surface of an inner cylinder of the dynamic pressure type bearing.

The thermosetting resin used in the present invention comprises, e.g., epoxy resin, phenol resin, diallyl phthalate resin and unsaturated polyester resin. However, the present invention is not restricted to these kinds of thermosetting resins.

The heat treated phenol resin powder comprises spherical particles and provides a superior wear resistance to a molded product.

A phenol resin powder which has been heat treated at 600° C. to 2,000° C. in an inert gas is preferable. The surface of each particle of a phenol resin powder which has been heat treated below 600° C. is insufficiently carbonized so that a molding shrinkage percentage of the phenol resin powder unpreferably increases. The phenol resin powder is dispersed in a composition made of resins providing the inner cylinder and appears in the inner surface of the inner cylinder to produce a structure in the form of an island together with the thermosetting resin of the composition, thereby suppressing the process of wearing.

In addition, since each of particles of the sufficiently heat treated phenol resin powder is spherical and the surface of each particle is in the form of the surface of amorphous carbon, each particle has a superior frictional characteristic which will not damage the rotatable shaft mating with the inner cylinder made of the composition containing the sufficiently heat treated phenol resin powder.

An average particle size of the sufficiently heat treated phenol resin powder is 5 micrometers to 40 micrometers. A particle of a more than 100 micrometer particle size will unfavorably deteriorate the smoothness of the inner cylindrical surface of the inner cylinder. When the content of the sufficiently heat treated phenol resin powder is below 5 wt %, the amount of the sufficiently heat treated phenol resin powder appearing on the inner surface of the inner cylinder is too low to increase the wear resistance of the inner cylinder.

The low linear expansion coefficient of silicon dioxide, $SiO_2$, suppresses the molding shrinkage percentage of the composition made of resins. A low orientational characteristic of silicon dioxide caused by the isotropic nature thereof prevents the molding accuracy of the composition made of resins caused by orientation.

The form of silicon dioxide is not particularly restricted in the present invention. However, spherical silicon dioxide is preferable. An average particle size of the spherical silicon dioxide is 5 micrometers to 30 micrometers at optimum.

When the total content of the sufficiently heat treated phenol resin powder and silicon dioxide is below 50 wt %, the molding shrinkage percentage of the single thermosetting resin remains high and possibly causes the molding shrinkage percentage of the inner cylinder to exceed an allowable range. On the other hand, when the total content of the sufficiently heat treated phenol resin powder and silicon dioxide exceeds 80 wt %, a poor resin molding fluidity increases a molding pressure differential between a molten resin pressure at the gate of a mold and a molten resin pressure at a distal end of the mold so as not to provide a satisfactory molding accuracy. Thus, the total content of the sufficiently heat treated phenol resin powder and silicon dioxide falls within 50 wt % to 80 wt %. An experiment of the present inventor discovered that the total content of the sufficiently heat treated phenol resin powder and silicon dioxide preferably falls within 65 wt % to 75 wt %.

The superior frictional characteristic of the inner cylindrical surface of the inner cylinder prevents any damage to the mating spindle made of the alloy containing relatively soft aluminium, as a main element and constituting part of a spindle unit constructed in accordance with the present invention.

The inner cylinder of the bearing of the present invention has a superior wear resistance, frictional characteristic and molding accuracy. In addition, the spindle unit of the present invention can employ a light, inexpensive, relatively soft spindle exposed to mechanical damage since the mating inner cylinder of the bearing has a superior frictional characteristic.

BRIEF DESCRIPTION OF THE DRAWINGS

FIGS. 1(a)-1(c) are cross-sectional views through parts of a dynamic pressure type bearing of the present invention illustrating a process for producing the bearing.

DETAILED DESCRIPTION OF THE PREFERRED EMBODIMENTS

Figure 2:
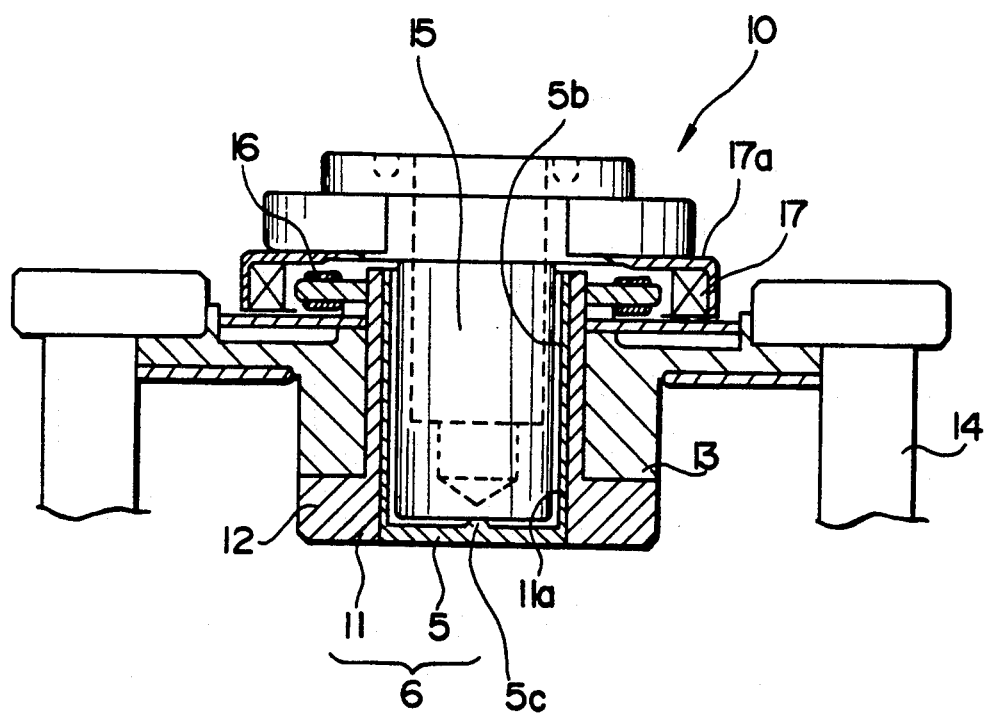
FIG. 2 is a front sectional view through a spindle unit of the present invention.

The preferred embodiments of the present invention will be described with reference to the drawings.

First, a process for producing a dynamic pressure type bearing of the present invention will be described with reference to FIGS. 1(a) to 1(c). A hot setting adhesive is applied to the inner cylindrical surface 1a of a hollow outer cylinder 1 which is made of a metal. Second, the outer hollow cylinder 1 is placed in a mold 2 comprising a top part 2a, an intermediate part 2b and a bottom part 2c. A pin-shaped mold core 3 is placed in the outer cylinder 1 so as to align with the inner cylindrical surface 1a of the outer cylinder 1. The mold core 3 carries ridges 3a on the outer cylindrical surface thereof which correspond to dynamic pressure producing grooves 5a described below. Since the major diameter of the mold core 3 is slightly smaller than the bore diameter of the outer cylinder 1, the inner cylindrical surface 1a of the outer cylinder 1 and the outer cylindrical surface of the mold core 3 together define an annular space 4 therebetween. Then, a hot, molten thermosetting resin with a filler is injected into the space 4 through a gate 2d defined in the mold top part 2a. Thus, the hot setting adhesive applied to the inner cylindrical surface 1a of the outer cylinder 1 fastens the thermosetting resin to the inner cylindrical surface 1a of the outer cylinder 1. Concurrently, the ridges 3a of the mold core 3 define dynamic pressure producing grooves 5a in the inner cylindrical surface of an intermediate molded product of an inner hollow bottomed cylinder 5 made of the thermosetting resin under setting. Thus, a setting of the thermosetting resin provides the inner cylinder 5 in close contact with the inner cylindrical surface 1a of the outer cylinder 1. The center of the upper edge surface of the mold core 3 defines a recess 3b thereon which in turn provides a corresponding below-described projection or pivot to the inner surface of the top wall of the inner cylinder 5. Once the intermediate molded product made of the thermosetting resin under setting becomes completely set to provide the inner cylinder 5, the mold top part 2a is removed and then ejector pins 7 axially push off the dynamic pressure type bearing 6 comprising the outer cylinder 1 and inner cylinder 5 so as to release the mold intermediate part 2b, the bottom part 2c and the mold core 3 from the bearing 6.

The volume of the inner cylinder 5 made of the thermosetting resin is reduced in molding. Since the inner cylinder 5 which is fastened to the inner cylindrical surface of the outer cylinder 1 shrinks so that the bore diameter of the inner cylinder 5 increases, the mold release resistance of the bearing 6 is relatively low. However, an interference between the ridges 3a and the dynamic pressure producing grooves 5a results, so that the ridging portion of each dynamic pressure producing groove 5a is exposed to a scratch when the mold 2 is released from the bearing 6.

As well known, filling the thermosetting resin with wax can prevent an occurrence of the scratch. In particular, the wax filling the thermosetting resin is eluted into a clearance between the inner cylindrical surface 5b of the inner cylinder 5 and the outer cylindrical surface of the mold core 3 to produce a very thin lubricating film therebetween which facilitates the release of the mold core 3 from the inner cylinder 5 and moderates impacts between the ridges 3a and inner cylinder 5 when the mold core 3 is released from the inner cylinder 5.

During the mold release, the wax has been melted or softened when the inner cylinder 5 is molded. Thus, the melting point or softening point of the wax must be lower than at least the temperature of the setting process of the thermosetting resin. In addition, when a wax content of the resin composition is 0.1 wt % or less, an eluted amount of the wax appearing on the surface of the inner cylinder 5 is insufficient. On the other hand, when the wax content exceeds 5 wt %, the effect of the hot setting adhesive applied to the inner cylindrical surface 1a of the outer cylinder 1 is reduced so that the fastening of the inner cylinder 5 to the outer cylinder 1 is insufficient, thereby decreasing the molding accuracy of the inner cylinder 5. Thus, a 0.1 wt % to 5 wt % wax is preferably added to the resin, and an about 1 wt % (i.e., 1.0 wt % to 1.1 wt %) is more preferably added to the resin.

FIG. 2 is a front sectional view through a spindle unit 10 employing the air dynamic pressure type bearing 6.

The spindle unit 10 is used with a scanner unit in a laser beam printer.

The bottom of a hollow outer cylinder 11 of the bearing 6 has an outwardly extending flange 12 integrally formed with the outer cylinder 11. A hollow inner bottomed cylinder 5 is fastened to the inner cylindrical surface 11a of the outer cylinder 11 by the above-described process. The bearing 6 is fixed to a hold-down 14 by means of the flange 12 and a retainer 13. A rotatable shaft or spindle 15 is mounted in the inner cylinder 5 so that the center of the bottom edge surface of the spindle 15 is in contact with the top edge of a pivot 5c provided at the center of the bottom surface of the inner cylinder 5. Thus, friction between the bottom surface of the inner cylinder 5 and bottom edge surface of the spindle 15 is low.

The spindle 15 is made of a metal, e.g., aluminium, an aluminium alloy, copper, a copper alloy, carbon steel, an alloyed steel, stainless steel, tool steel or bearing steel. The aluminium alloy may contain at least one element selected from the group of Si, Cu, Fe, Mn, Mg, Zn, Zr, Ga, V and Ti, or contain at least two elements selected from the group and at least one of a wear-resistant matter, such as carbon fiber or glass fiber, and a lubricant, such as carbon. The aluminium content of the aluminium alloy is greater than the total content of the other elements of the aluminium alloy. The content and kind of an element other than aluminium depends on the required performance of the spindle 15.

A stator coil 16 is mounted to the upper end of the outer cylindrical surface of the outer cylinder 11 coaxially with the bearing 6. The spindle 15 has an annular rotor magnet 17 surrounding the stator coil 16 and mounted to the spindle 15 by means of a yoke 17a so as to provide a drive motor. In accordance with the spindle unit 10, energizing the stator coil 16 causes the rotor magnet 17 to produce a torque on the spindle 15 causing the spindle 15 to rotate. The dynamic pressure producing grooves (not shown in FIG. 2) defined in the inner cylindrical surface 5b of the inner cylinder 5 produces an air dynamic pressure to float and to center the spindle 15, so that the spindle 15 rotates out of contact with the inner cylindrical surface 5b of the inner cylinder 5.

Hereinafter, an experiment conducted by the present inventor will be described. In this experiment, the present inventor employed phenol-modified epoxy resin as the thermosetting resin for the inner cylinder 5, selected fillers suitable for the thermosetting resin and confirmed the molding shrinkage percentage and molding accuracy of a phenol-modified epoxy resin with each of the fillers. The present inventor examined the durability of each of the phenol-modified epoxy resins with the fillers clearing the criteria of the molding shrinkage percentage and the molding accuracy of the inner cylinder 5 in the spindle unit 10 of FIG. 2 when the drive motor of the spindle unit 10 is repeatedly started and stopped. The outer cylinder 11 and the spindle 15 are both made of an alloy containing aluminium as a main element. The inner cylindrical surface 11a of the outer cylinder 11 has an epoxy based, hot setting adhesive applied thereto prior to molding.

A transfer molding machine molded all test pieces from molten thermosetting resins in an annular cavity of a mold providing a bottomed hollow cylinder with a 30 mm outer diameter and a 7 mm to 10 mm thick wall under a 250 Kg/cm² to 300 Kg/cm² pressure at 150° to 180° C. for a 5 minute setting time. The molding shrinkage percentages of all the test pieces were computed from the following equation (1):

$$MSP(\%) = \frac{A - B}{A} \times 100 \quad (1)$$

wherein MSP represents a molding shrinkage percentage, A represents the bore diameter of the mold at room temperature, and B represents the outer diameter of each of the test pieces at room temperature. A test piece of a 0.7% or less molding shrinkage percentage was judged acceptable.

Each of the bottomed inner cylinders 5 with a 22 mm bore diameter and a 30 mm depth and made of a thermosetting resin was molded by the same process as described with FIGS. 1(a) to 1(c) and the molding accuracy of that inner cylinder 5 was confirmed. A bore diameter accuracy of the inner cylinder 5 with a 3 micrometer or less roundness and a 5 micrometer or less cylindricity was judged acceptable (i.e., indicated in Table 1).

Each of the inner cylinders 5 made of thermosetting resins of acceptable molding shrinkage percentages and acceptable bore diameter accuracies was used in the spindle unit 10 of FIG. 2 and subjected to a start-stop durability test. The start-stop durability test was conducted with a 150 gf to 200 gf thrust load and a 18,000 rpm to 18,500 rpm steady-state rotational speed. An inner cylinder 5 which has experienced 5,000 or more start-stop operations and both the inner cylindrical surface 5b and cylindrical surface of the spindle 15 of which have experienced almost no flaws was judged acceptable (i.e., indicated by O in Table 1). Two kinds of spherical silicon dioxide and molten silicon dioxide were employed. Three kinds of phenol resin powders respectively with 800° C., 500° C. and 300° C. heat treatments were employed. A 1 wt % wax was employed for filler.

Table 1 shows compositions of employed fillers and results of the experiment.

TABLE 1

| | | Filler (wt %) | | | | | | Molding | Bore | |
| | | Spherical silicon dioxide | Molten silicon dioxide | Phenol resin power | | | PTFE | shrinkage (%) | diameter accuracy | Start-stop test result |
| | | | | 800° C. | 500° C. | 300° C. | | | | |
|---|---|---|---|---|---|---|---|---|---|---|
| Example | (1) | 50.0 | — | 20.0 | — | — | — | 0.37 | O | O |
| | (2) | — | 50.0 | 20.0 | — | — | — | 0.43 | O | O |
| | (3) | 5.0 | — | 65.0 | — | — | — | 0.45 | O | O |
| | (4) | 50.0 | — | 16.0 | — | — | 4.0 | 0.38 | O | O |
| | (5) | 50.0 | — | 30.0 | — | — | — | 0.31 | O | O |
| Control | (1) | — | — | 50.0 | — | — | — | 0.72 | X | — |
| | (2) | — | — | — | 70.0 | — | — | 1.36 | X | — |
| | (3) | — | — | — | — | 70.0 | — | 0.81 | X | — |
| | (4) | — | — | 33.0 | — | — | 17.0 | 1.10 | X | — |
| | (5) | 70.0 | — | — | — | — | — | 0.31 | O | X |

TABLE 1-continued

| | Filler (wt %) | | | | | | Molding | Bore | |
|---|---|---|---|---|---|---|---|---|---|
| | Spherical silicon dioxide | Molten silicon dioxide | Phenol resin power | | | | shrinkage | diameter | Start-stop |
| | | | 800° C. | 500° C. | 300° C. | PTFE | (%) | accuracy | test result |
| (6) | 50.0 | — | 33.0 | — | — | — | 0.27 | X | — |

As apparent from Table 1, an inner cylinder 5 made of each of thermosetting resins in Examples 1 to 5 cleared the criteria of the molding shrinkage percentage, bore diameter accuracy and start-stop test. On the other hand, an inner cylinder 5 made of each of thermosetting resins with Controls 1 to 4, containing neither spherical silicon dioxide nor molten silicon dioxide, could not clear the criteria of the molding shrinkage percentage and bore diameter accuracy. An inner cylinder 5 made of a thermosetting resin with Control 5, containing spherical silicon dioxide but not sufficiently heat treated phenol resin powder, could not clear the criterion of the start-stop test since the inner cylinder 5 made of the thermosetting resin with Control 5 had a poor frictional characteristic and wear resistance. An inner cylinder 5 made of a thermosetting resin with Control 6, containing a more than 80 wt % total content of silicon dioxide and sufficiently heat treated phenol resin powder, could not clear the criterion of the bore diameter accuracy since the fluidity of the thermosetting resin with Control 6 was poor.

In accordance with the present invention, a dynamic pressure type bearing has a superior wear resistance, frictional characteristic and molding accuracy. Since an inner cylinder 5 having superior wear resistance and frictional characteristic will almost never damage a mating spindle 15, the spindle 15 may be made of an alloy containing aluminium as a light and inexpensive main element. Thus, a light, inexpensive spindle unit employing a dynamic pressure type bearing of the present invention is provided.

In accordance with the above-described examples, only the inner cylindrical surface 5b of the inner cylinder 5 defines the dynamic pressure producing grooves 5a therein. However, the present invention is not restricted to this inner cylinder 5, but is applicable to a dynamic pressure type bearing with only the cylindrical surface of a mating spindle defining dynamic pressure producing grooves therein and, also, a dynamic pressure type bearing with both the inner cylindrical surface of an inner cylinder and the cylindrical surface of a mating spindle defining dynamic pressure producing grooves therein.

What is claimed is:

1. A dynamic pressure type bearing comprising:
   a hollow outer cylinder made of a metal; and
   a hollow inner cylinder made of a synthetic resin and having an outer cylindrical surface fastened to an inner cylindrical surface of said outer cylinder and having an inner cylindrical surface fitting a rotatable shaft;
   at least one of the outer cylindrical surface of the rotatable shaft and the inner cylindrical surface of said inner cylinder defining a dynamic pressure producing groove therein; and
   said inner cylinder being made of a thermosetting resin containing a 5 wt % to 75 wt % heat treated phenol resin powder and a 5 wt % to 75 wt % silicon dioxide, the total content of the heat treated phenol resin powder and the silicon dioxide being 50 wt % to 80 wt %.

2. The dynamic pressure type bearing of claim 1 wherein the phenol resin powder is heat treated at a temperature of 600° C. to 2,000° C. in an inert gas.

3. The dynamic pressure type bearing of claim 1 wherein an average particle size of the phenol resin powder is 5 micrometers to 40 micrometers.

4. The dynamic pressure type bearing of claim 1 wherein an average particle size of the silicon dioxide is 5 micrometers to 30 micrometers.

5. A spindle unit, comprising:
   a dynamic pressure type bearing of claim 1; and
   a spindle made of an alloy containing aluminium as a main element and fitting the inner cylindrical surface of the inner cylinder of the dynamic pressure type bearing.

6. The spindle unit of claim 5 wherein the alloy contains at least one selected from the group of Si, Cu, Fe, Mn, Mg, Zn, Zr, Ga, V and Ti.

7. The spindle unit of claim 5 wherein the alloy contains at least two selected from the group of Si, Cu, Fe, Mn, Mg, Zn, Zr, Ga, V and Ti and at least one of a wear-resistant matter and a lubricant.

* * * * *